Patented May 2, 1939

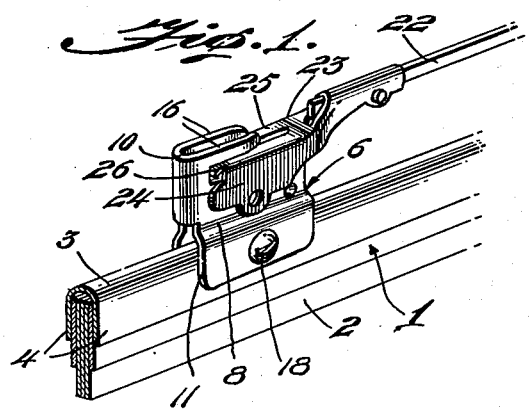
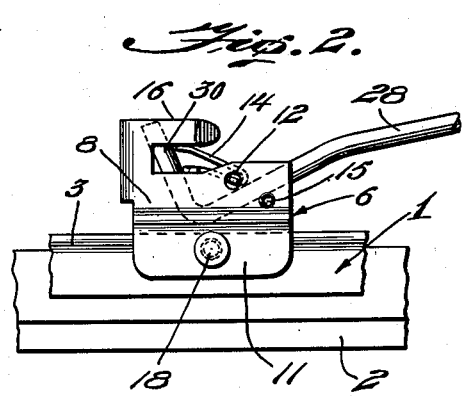
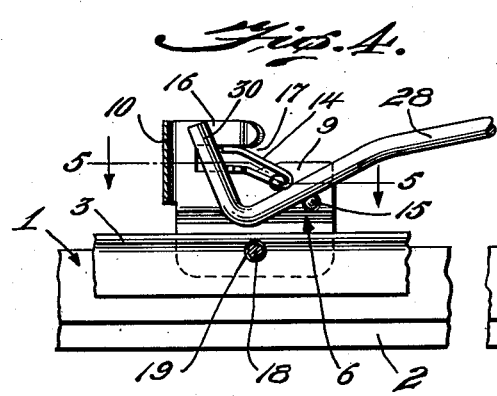
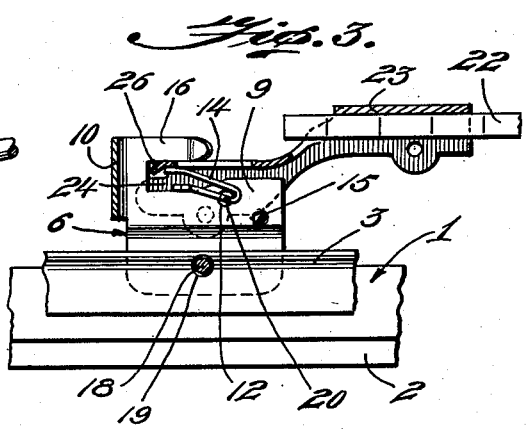
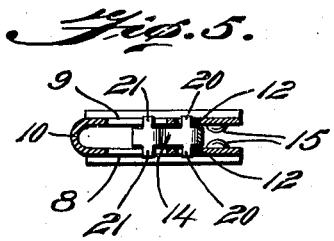

2,156,506

UNITED STATES PATENT OFFICE 2,156,506

WINDSHIELD WIPER CONSTRUCTION

Louis Marcolivio, Providence, R. I., assignor to Adelaine Romano, Providence, R. I.

Application October 25, 1937, Serial No. 170,779

2 Claims. (Cl. 15—250)

This invention relates to an improved windshield wiper construction, and more particularly to a novel means for connecting a windshield wiper blade with its operating wiper arm to hold the parts securely in operative relation and permit suitable movement of the wiper blade relative to the windshield during the wiping operation.

One object of the invention is the provision of means of this character adapted for use in connection with various forms of wiper arms such as are now in use or are adapted for use in the operation of wiper blades for windshields.

Another object of the invention is the provision of means of this character provided with a resilient member for engaging a portion of a wiper arm to hold the same in operative relation with the wiper blade and which is capable of release when it is desired to change or replace the wiper blade or its wiper arm connecting means.

Other objects and advantages of the invention relate to various improved details of construction and novel arrangements of the parts as will be more fully set forth in the detailed description to follow.

Refering to the drawing:

Fig. 1 is a perspective view of a portion of a wiper blade and one type of wiper arm, showing a connector member connecting the wiper arm and wiper blade, Fig. 2 is a side elevational view of a portion of a wiper blade and another type of wiper arm, together with the connector member, illustrating the manner of uniting the connector member to the wiper arm, Fig. 3 is a side elevational view of the structure shown in Fig. 1, with one side of the connector member broken away, to show the location of the parts with reference to the wiper blade and wiper arm, Fig. 4 is a side elevational view of the structure shown in Fig. 2, with one side of the connector member broken away, to show the position of the wiper arm and the arrangement of the parts of the connector member, Fig. 5 is a horizontal sectional view through the connector member, taken along a line corresponding substantially with that indicated by the section line 5—5 of Fig. 4, and, Fig. 6 is a perspective view of the spring member.

In the embodiment of the invention illustrated herewith, 1 designates generally the wiper blade which may be of any desired construction, but which in the present case is of the type wherein the wiper element comprises a plurality of plies 2 of rubber or the like which are clamped together and held in wiping position by means of a channel shaped holder member 3, which may be of any suitable construction and is preferably formed from metal stock and shaped to provide oppositely positioned lateral edge portions 4 for clamping the plies securely in place and retaining them in position for forming the wiper blade.

The wiper blade 1 may have secured thereto a connector member 6 for suitably connecting the wiper blade to any one of two or more different types of wiper arm after the manner indicated in the drawing.

The connector member 6 may be formed in any suitable manner as by being first cut or stamped from a sheet of thin metal stock in the form of a symmetrical shape and then further shaped and bent along its axis of symmetry to provide oppositely positioned spaced side portions 8 and 9 and an end wall 10. The end wall 10 terminates somewhat short of the lower side edges of the spaced side portions 8 and 9 to provide clearance for the wiper blade 1, and the lower extremities 11 of the side portions are preferably offset outwardly from each other a distance greater than that separating the upper portions of said side wall to provide space for the holder member sufficient to permit lateral tilting of the wiper arm in its movement across the windshield.

The side portions 8 and 9 are each provided with an opening 12, which openings are located in opposed aligned relation with each other to provide points of pivotal support for a spring member 14. Each side portion may also have an indented lug 15 struck inwardly from the outer face thereof, which lugs are in opposed relation with each other and provide a bearing for the wiper arm shown in Figs. 2 and 4 to retain the same in position relative to the connector member.

A finger member 16 may be formed as an integral part of the connector member 6 and extend rearwardly from the end wall 10 in spaced relation with the upper edges of the side wall portions 8 and 9, as shown in the drawing, which finger member may consist of oppositely positioned spaced leaves formed from the thin metal sheet from which the connector member is shaped. The provision of the finger member 16 in spaced relation with the upper edges of the side wall portions 8 and 9 serves to provide a substantially horizontal recess 17 between the upper edges of the side walls 8 and 9 and the finger member 16 capable of receiving a portion of a wiper arm of the type illustrated in Figs. 1 and 3 of the drawing.

Any suitable means may be provided for connecting the wiper blade with the connector member, such as a screw 18, and this may be of such size as to fit substantially loosely within an opening 19 formed in the holder plate 3 to allow free lateral tilting of the wiper blade relative to the connector member in the movement of the blade across a windshield.

The spring member 14 may be of a substantially U-shape and provided upon one arm with opposed lateral extensions 20 fitting within the openings 12 in the opposite side portions 8 and 9 of the connecting member to provide a pivotal mounting for the spring member 14, and opposed lateral extensions or lugs 21 adapted to overlie and rest upon the upper edges of the opposite side walls 8 and 9. The other arm of the U-shaped spring is resiliently supported within the recess 17 in such a manner as to provide a resilient tongue adapted to normally engage or substantially engage the finger member 16.

In Figs. 1 and 3 of the drawing the wiper blade and connector member are shown in association with a wiper arm 22 having an adjustable connecting member 23 carried thereby which may be adjusted longitudinally of the arm 22, and which is provided with a channeled end portion, substantially U-shaped in cross-section, having downwardly extending flanges 24 adapted to be positioned upon opposite sides of the opposed side portions 8 and 9 of the connector member, while a back portion 25 is adapted to project within the recess 17. The extreme end of the back portion 25 is bent downwardly to form a lip 26 which is adapted to be engaged by the end of the free arm portion of the spring 14 when fully inserted within the recess 17 to engage releasably and retain the connecting member portion 23 of the arm 22 in operative engagement with the connector 6 for moving the wiper blade across the windshield. When it is desired to release the connecting member 23 from the connector 6 the parts may be tilted relative to each other and the downturned lip 26 thus withdrawn from engagement by the free end of the spring 14.

In Figs. 2 and 4 of the drawing there is shown a wiper arm member 28 provided with a bent end portion 30 which is adapted for use in connection with the connector member 6 by inserting the bent end portion between the lower end of the spring 14 and the opposed lugs 15 and then turning the arm 28 about the lower end of the spring 14 until it occupies a position substantially as shown in Figs. 2 and 4 of the drawing. The oppositely positioned side wall portions 8 and 9 are spaced from each other a suitable distance so that the end 30 of the arm 28 fits substantially closely therebetween. Similarly, the downwardly extending flanges 24 of the connecting member 23 fits substantially closely against the outer side edges of the upper portions of the side walls 8 and 9 when the wiper arm 22 is employed.

It will be seen from the above that there is provided a windshield wiper structure having a connector member which is capable of and adapted for operative connection with any one of two or more different types of wiper arms in such a manner as to maintain each wiper arm in substantially rigid relation with the connector member, and at the same time provide for any desired lateral tilting movement on the part of the wiper blade by suitably proportioning the shank portion of the screw 18 with respect to the size of the opening 19 provided in the holder member portion of the wiper blade.

The spring 14 by reason of its shape and location with respect to the connector member serves in conjunction with the indented lugs 15 to provide a suitable passageway for the insertion of the bent end portion 30 of the wiper arm 28 so as to permit the insertion of the bent end portion 30 of the wiper arm and retain the same in suitable position for providing complete engagement of the wiping edge with the windshield glass. The provision of spring means, after the manner above described, for retaining the U-shaped portion of the connecting member 23 in the desired operating relation with the connector member is such as to facilitate the insertion of the end portion of the connecting member 23 in the recess 17 and permit its removal when desired, while at the same time suitably securing these parts together.

What I claim is:

1. A connecting means for securing a windshield wiper arm having a downturned end portion to a wiper blade comprising a member having spaced sides, a finger carried by said member extending over and spaced from portions of said spaced sides, and a spring member mounted between and supported by opposed portions of said spaced sides and having a resilient arm projecting angularly within the space between said finger and spaced sides and having an inclined end portion for engaging releasably the downturned end portion of a wiper arm inserted between said spaced sides and finger.

2. A connecting means for securing a windshield wiper arm to a wiper blade comprising a member having oppositely positioned spaced sides, a finger carried by said member extending over and spaced from the upper edge portions of said spaced sides, and a spring member comprising a tongue and body portion divergently related, means carried by the body portion engageable with portions of the spaced sides to support the spring member in position to maintain the divergent tongue within the space separating the finger from the spaced sides and in position to engage resiliently a portion of a wiper arm inserted therein.

LOUIS MARCOLIVIO.